(12) United States Patent
Rist et al.

(10) Patent No.: US 8,995,629 B2
(45) Date of Patent: Mar. 31, 2015

(54) COMPUTER TELEPHONY INTEGRATION WITH CONNECTION OF THE COMPUTER VIA A PRESENCE-SERVER

(75) Inventors: Claus Rist, Bochum (DE); Sebastian Cordes, Lippstadt (DE); Johannes Winter, Gumpoldskirchen (AT); Viktor Ransmayr, München (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 13/883,900

(22) PCT Filed: Dec. 22, 2011

(86) PCT No.: PCT/EP2011/006531
§ 371 (c)(1),
(2), (4) Date: Jul. 22, 2013

(87) PCT Pub. No.: WO2012/084257
PCT Pub. Date: Jun. 28, 2012

(65) Prior Publication Data
US 2013/0294592 A1 Nov. 7, 2013

(30) Foreign Application Priority Data

Dec. 23, 2010 (EP) .................................. 10 016 049
Sep. 26, 2011 (EP) .................................. 11 007 818

(51) Int. Cl.
*H04M 11/00* (2006.01)
*H04M 3/42* (2006.01)
(Continued)

(52) U.S. Cl.
CPC ....... *H04M 3/42382* (2013.01); *H04L 12/5815* (2013.01); *H04L 12/589* (2013.01);
(Continued)

(58) Field of Classification Search
None
See application file for complete search history.

(56) References Cited

U.S. PATENT DOCUMENTS

| 7,567,553 B2 * | 7/2009 | Morris ........................ 370/352 |
|---|---|---|
| 2004/0044782 A1 * | 3/2004 | Schmidt ....................... 709/230 |

(Continued)

FOREIGN PATENT DOCUMENTS

| DE | 10159636 B4 | 10/2005 |
|---|---|---|
| WO | 98/51092 | 11/1998 |

(Continued)

OTHER PUBLICATIONS

"XML Protocol for Computer Supported Telecommunications Applications (CSTA) Phase III" publication info. XP007920249, vol. 5th Edition, Nr :ECMA-323, pp. 1-636.

(Continued)

*Primary Examiner* — Duc Nguyen
*Assistant Examiner* — Assad Mohammed
(74) *Attorney, Agent, or Firm* — Buchanan Ingersoll & Rooney PC

(57) ABSTRACT

The invention relates to the field of Computer telephony Integration and in particular to the migration of the interface standardised according to ECMA-29 to the private branch exchange (PBX) via a CSTA gateway. The clients (C1-C4) in the data network subscribe to CTI Services and in this regard must be reachable by the CSTA gateway (CCGW). If this is not the case, because for example an error occurs in the data network, then the transmission of unnecessary messages should be prevented or stopped. The problem is solved in that the clients are connected via a server (XS) to the CCGW, wherein the server monitors the Status of the clients and acknowledges the messages addressed to an unreachable client with error messages. The server (XS) is preferably an XMPP server and the clients (C1-C4) are preferably XMPP clients. In order to permit transport of the CSTA messages via XMPP, info/query stanzas according to RFC3920 are used, since they have the advantage over message stanzas that they are acknowledged by the remote Station.

12 Claims, 8 Drawing Sheets

(51) Int. Cl.
*H04L 12/58* (2006.01)
*H04M 7/00* (2006.01)

(52) U.S. Cl.
CPC .............. *H04L51/043* (2013.01); *H04L 51/36* (2013.01); *H04M 3/42323* (2013.01); *H04M 7/0012* (2013.01); *H04M 2242/16* (2013.01)
USPC .................................... 379/93.01; 379/201.1

(56) References Cited

U.S. PATENT DOCUMENTS

| | | | |
|---|---|---|---|
| 2007/0064672 A1* | 3/2007 | Raghav et al. | 370/351 |
| 2011/0182281 A1* | 7/2011 | Siddique et al. | 370/352 |

FOREIGN PATENT DOCUMENTS

| | | | |
|---|---|---|---|
| WO | 2005/074233 A1 | 8/2005 | |
| WO | 2008/103934 A2 | 8/2008 | |

OTHER PUBLICATIONS

Written Opinion of the International Searching Authority for PCT/EP2011/006531 dated Feb. 24, 2012 (Form PCT/ISA/237) (German Translation).

International Search Report for PCT/EP2011/006531 dated Feb. 24, 2012 (Forms PCT/ISA/220, PCT/ISA/210) (German Translation).

"Web Services for Service-Oriented Communication" (Invited Paper) Chou et al., IEEE, 2006.

International Preliminary Report on Patentability and Written Opinion for PCT/EP2011/006531 dated Jul. 4, 2013 (German Translation).

International Preliminary Report on Patentability and Written Opinion for PCT/EP2011/006531 dated Jul. 4, 2013 (English Translation).

* cited by examiner

COMPUTER TELEPHONY INTEGRATION WITH CONNECTION OF THE COMPUTER VIA A PRESENCE-SERVER

CROSS REFERENCE TO RELATED APPLICATIONS

This application is the United States national phase of 35 USC §371 of PCT International Application No. PCT/EP2011/006531, filed on Dec. 22, 2011, and claiming priority to EP 11 007 818.5 filed on Sep. 26, 2011, and EP 10 016 049.8, filed on Dec. 23, 2010.

BACKGROUND OF THE INVENTION

1. Field of the Invention

Embodiments of the invention relate to methods for monitoring of a connection in an exchange system in a telecommunications network.

2. Background of the Related Art

Data networks are primarily used for networking computers, for example, PCs with servers. Methods and arrangements in which applications installed on computers control and monitor communication systems and communication connections are generally known as CTI solutions (CTI=Computer Telephony Integration). Both communication system ports and connections between ports can be controlled and monitored in this manner. The respective connections are temporary communication channels between two or more participants of one or more communication systems.

When a CTI solution is operating, data with control and status information is transmitted each time between a communication system and a CTI application (CTI application program). For this purpose, the communication systems provide special interfaces for exchanging data, the CTI interfaces. Likewise, the applications and/or PCs provide a corresponding CTI interface for this data exchange. For this, the CTI interfaces of the communication system and those of the application are connected with one another via a data line or a data network. The maximum number of CTI interfaces is limited on one communication system so often a telephony server is connected between the communication system and the applications.

The publication WO 98/51092 A1 "Computer Telephony Integration Gateway" shows a public communication network with several communication systems and a private communication network with several domains that each feature computers with applications for controlling and/or monitoring of the public communication network's resources. The arrangement shown features a "CTI gateway" as a conversion device, which changes the type of data sent for controlling and/or monitoring of resources from the public communication network to the private communication network, so that this data appears as the data from one single public communication network, and conversely changes the data that is sent by the private communication network with the applications to the public communication network, as though it had been sent from a private communication network with only one application.

DE 000010159636 B4 describes a method for controlling and/or monitoring of resources and connections by means of exchanging data between communication systems and at least one application, wherein the data have identifiers that differentiate the resources and the connections and the identifiers of the resources are converted during the exchange in such a way that they present themselves as the identifier of one single communication system with subscriber connections for the one or every application, characterized in that each of the identifiers of the connection between resources of different communication systems comprises one local connection number (call ID) of the communication system participating in the connection and one global connection number (call ID) and in that the global connection number (call ID) is transmitted for the application through the conversion so that it is not distinguishable from a local connection number (call ID) by the application.

BRIEF SUMMARY OF THE INVENTION

The invention concerns a method for automatic monitoring of a connection (CTI-L) in an exchange system (PBX) in a telecommunications network (TN) with a data network (DN) in which an exchange system (PBX) of the telecommunications network is connected with an IM server (XS) of the data network via a device (CCGW), which enables the IM server to provide the computer telephony integration services of the exchange system (PBX) to a communication participant on the data network.

According to embodiments of the invention, a method is provided for automatic monitoring of a connection (CTI-L) in an exchange system (PBX) in a telecommunications network (TN) with a data network (DN) in which an exchange system (PBX) of the telecommunications network is connected with an IM server (XS) of the data network via a device (CCGW), which enables the IM server to provide the computer telephony integration services of the exchange system (PBX) to a communication participant on the data network. Computer telephony integration services and messages are transmitted by a request/response mechanism that provides an error message to the sender in the event of a failure.

One preferred embodiment of the present invention, whose features can also be combined with features of other embodiments, provides a method for using IQ stanzas for the request/response mechanism.

One preferred embodiment of the present invention, whose features can also be combined with features of other embodiments, provides a method for using "direct presence" messages for the request/response mechanism.

One preferred embodiment of the present invention, whose features can also be combined with features of other embodiments, provides a method which enables the IM server to provide computer telephony integration services of the exchange system (PBX) to a communication participant on the data network, in which an IM client (XC) is allowed to subscribe to such computer telephony integration services of the exchange system (PBX).

Another preferred embodiment of the present invention, whose features can also be combined with features of other embodiments, provides a method in which the device (CCGW) performs mapping between a CSTA-specific Invoke ID (CSTA-IID) on one side and a Jabber Identifier (JID) of the IM client and/or an XMPP session ID (XSID).

Another preferred embodiment of the present invention, whose features can also be combined with features of other embodiments, provides a method in which the communication between the device (CCGW) and the IM server is configured as a server-server connection.

Another preferred embodiment of the present invention, whose features can also be combined with features of other embodiments, provides a method in which the communication between the device (CCGW) and the IM server is executed via a server component according to XEP 0114 or another Jabber component protocol comparable to XEP 0114.

Another preferred embodiment of the present invention, whose features can also be combined with features of other embodiments, provides a method in which the so-called Invoke ID is used for assigning a request to an associated response.

Another preferred embodiment of the present invention, whose features can also be combined with features of other embodiments, provides a method in which the Invoke ID used for assigning a request to an associated response is unique across all requests.

Another preferred embodiment of the present invention, whose features can also be combined with features of other embodiments, provides a method in which the IQ stanzas are used for CSTA transport via XMPP, said IQ stanzas featuring a request/response mechanism that is comparable to that request/response mechanism used by CSTA.

Another preferred embodiment of the present invention, whose features can also be combined with features of other embodiments, provides a method by which an IM client generates an XMPP session ID, which is different from other XMPP session IDs for the same IM client.

Embodiments are described below in more detail based on preferred exemplary embodiments and with reference to the figures.

DETAILED DESCRIPTION OF THE INVENTION

Figure 1:
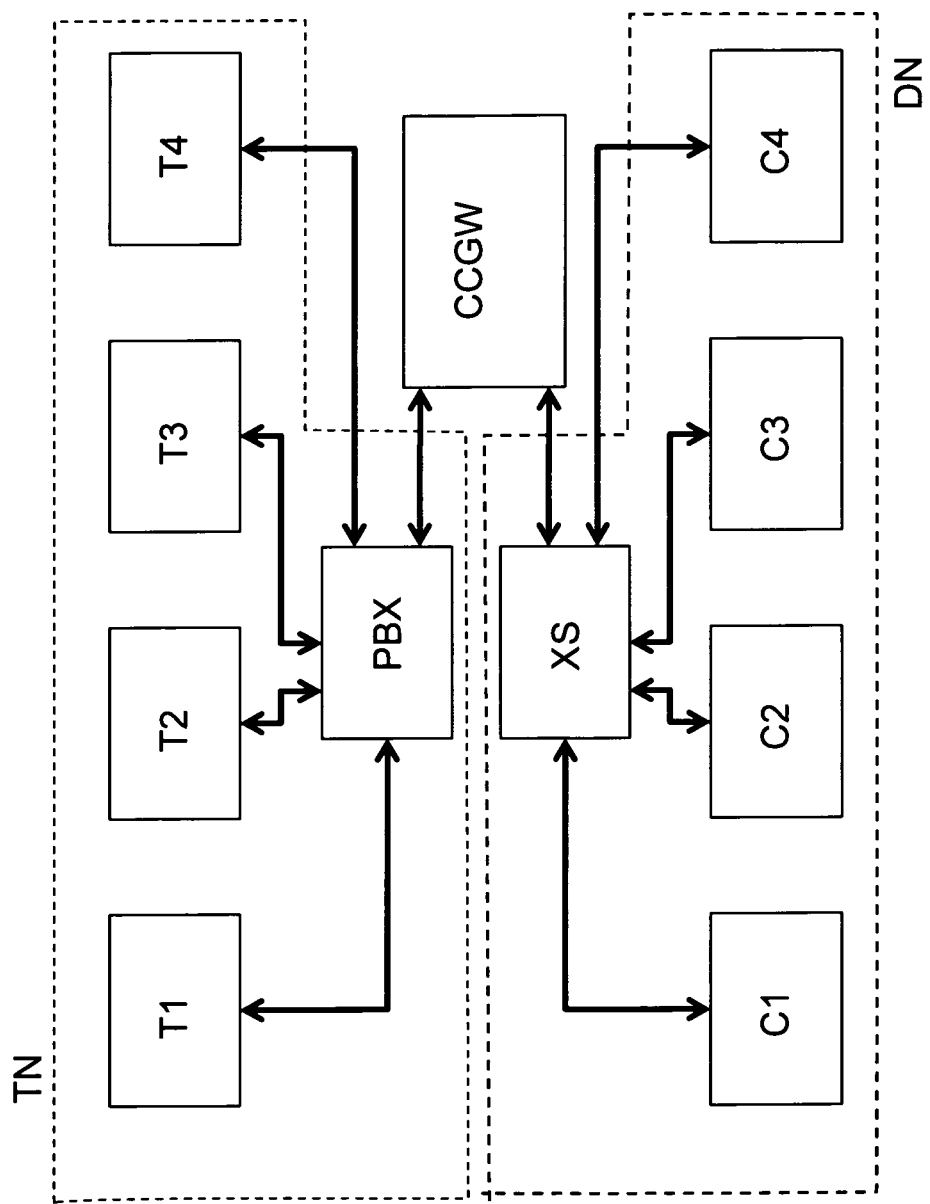
FIG. 1 schematically shows a first arrangement of system components for realization of an exemplary embodiment of one method according to the invention.
Figure 2:
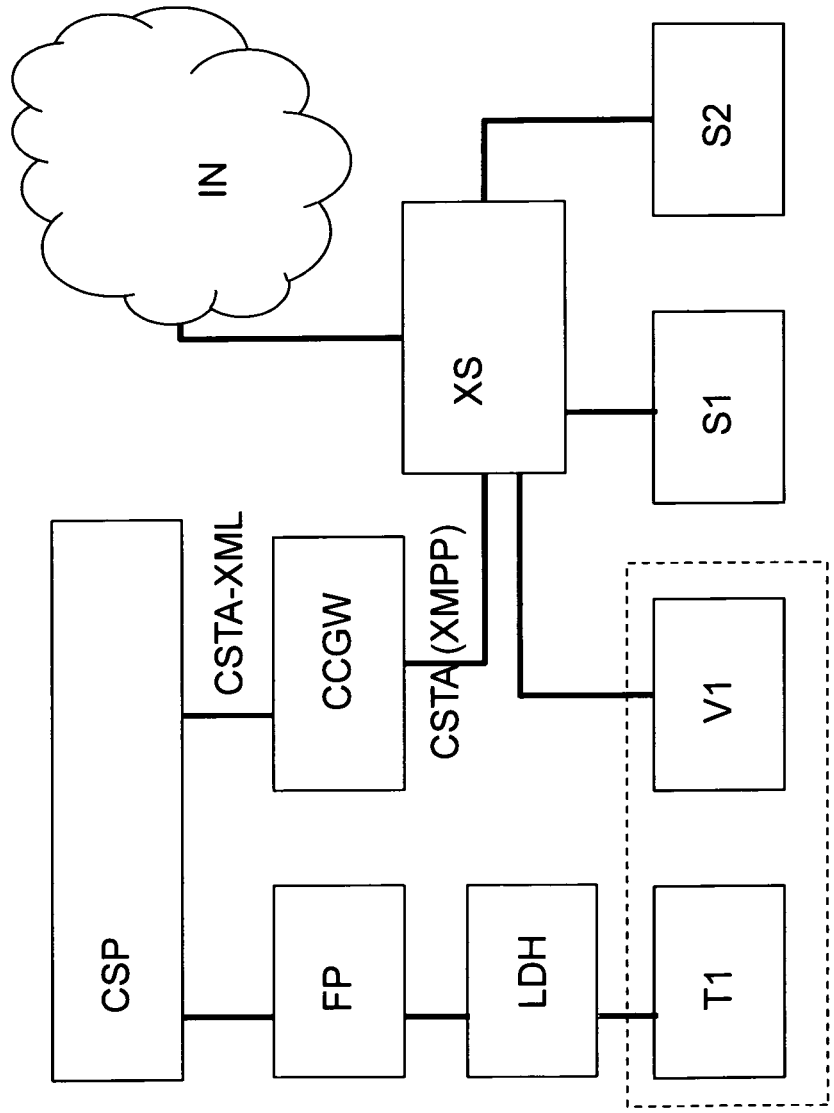
FIG. 2 schematically shows a second arrangement of system components for realization of an exemplary embodiment of one method according to the invention.

FIGS. 1 and 2 schematically show the embedding of the CCGW in the entire system. FIG. 2 shows in particular an embedding of the CCGW in the entire system.

As shown in FIG. 1, functions of a telecommunications network TN in a data network DN, consisting of telecommunications terminals T1, T2, T3, T4 and an exchange system PBX and, if applicable, additional components are integrated by integrated by connecting an exchange system PBX of the telecommunications network to an IM server XS on the data network, where the clients C1, C2, C3 and C4 communicate via the IM server XS, via the device CCGW, which enables the IM server to provide computer telephony integration services of the exchange system PBX to a communication participant on the data network.

On the one side, the connection to the feature processing FP is established via CSTA XML here by means of a so-called CSTA service provider (CSP). On the other side, the CSTA is transmitted via XMPP to the XMPP server XS. Using the CCGW, an XMPP client S1, S2 can subscribe to CTI services. Communication between the CCGW and the XMPP server can be arranged as a server-server or server-client connection as well as via a server component according to XEP 0114 or another Jabber component protocol comparable to XEP 0114.

The IM server XS also creates a connection between clients S1, S2 and the Internet IN in the example shown in FIG. 2. VI indicates a visualization of the communication on the terminal T1. The XMPP protocol can serve as a typical example of an instant messaging (IM) protocol. XMPP-based client/server architectures run asynchronous to the telephone in the prior art. Automatic monitoring of a CTI link within an XMPP environment is not provided according to the prior art.

According to the exemplary embodiment of the invention considered, the XMPP client subscribes to CTI services via the XMPP server with an exchange system PBX. The exchange system "PBX" provides this function through a Call Control Gateway (CCGW). The CCGW provides a gateway from the PBX to the XMPP network and is the connection between the CTI of a PBX and the XMPP server. The CTI services themselves—depending on the embodiment of the invention, for example, CSTA events and CSTA requests—are exchanged then via the XMPP network as XMPP IQ messages (so-called IQ stanzas) preferably according to RFC 3920bis.

The PBX and XMPP server (XS) are connected using a Call Control Gateway (CCGW). Through this call control gateway, an XMPP client can subscribe to and provide CTI services. This concerns the CSTA call control services and events described in ECMA-269 in one embodiment.

FIG. 2 schematically shows the embedding of the CCGW in the entire system realized in the form of OpenScape Office MX and the associated affected component's. On one side, the connection to feature processing is established via CSTA XML. On the other side, CSTA is transmitted via XMPP to the XMPP server (in the exemplary embodiment shown in FIG. 2: Openfire). Using the CCGW, an XMPP client S1, S2 (Spark for example) can subscribe to CTI services. To enable the transport of XML-encoded CSTA via XMPP, IQ stanzas are expanded by a <csta/> tag. IQ stanzas are preferred for transporting CSTA, because they offer the advantage over message stanzas that they are acknowledged by the other side.

Communication between the CCGW and the XMPP server can be realized in different ways depending on the embodiment of the invention:

via an XMPP server-server connection, i.e. the CCGW acts as an autonomous XMPP server.

via an XMPP client-server connection or another Jabber component protocol comparable to XEP 0114, i.e. the CCGW is administered as the client in the XMPP server (e.g. Openfire).

as a server component according to XEP 0114 or another Jabber component protocol comparable to XEP 0114, i.e. the CCGW is a server component of the XMPP server.

Figure 3:
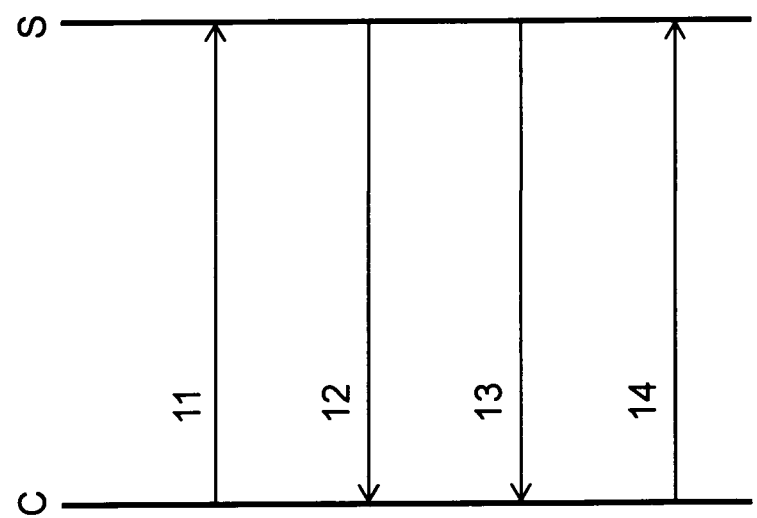
FIG. 3 schematically shows a flow diagram of a component of a sequence of one method according to the invention based on a preferred exemplary embodiment of the invention.

FIG. 3 shows an exemplary embodiment of the invention using a CSTA MakeCall with MakeCall Response and an event including an acknowledgment. Client C sends the message 11 with the text 11 to the server S. The server S answers by sending the message 12 with the text 12 to the client C. The server S then sends message 13 with text 13 to the client C, whereupon the client C sends message 14 with text 14 to the server S.

The texts of the messages are compiled in an overview at the end of the description. By transmitting CTI services and messages as IQ stanzas between the CCGW and the XMPP client (via XMPP server), an automatic monitoring of the CTI link from the XMPP client to its XMPP server is also ensured. Namely, if this connection is no longer present (e.g. due to a faulty LAN segment), the XMPP server must respond in place of the addressed XMPP client to an IQ stanza request with an "error" type IQ stanza with the value "service unavailable" (RFC 3920bis). In the event of error, appropriate measures for clearing the error can thereby be initiated at the CCGW on the CTI level.

Figure 4:
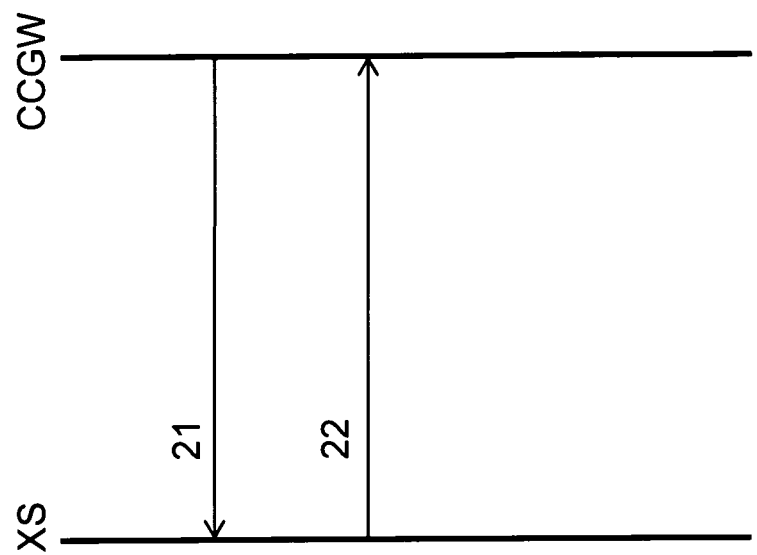
FIG. 4 schematically shows a flow diagram of a component of a sequence of one method according to the invention based on a preferred exemplary embodiment of the invention.

FIG. 4 shows an exemplary embodiment of the invention using an IQ stanza error. The device CCGW sends a message 21 with the text 21 to the server XS, whereupon the server XS sends the message 22 with the text 22 to the device CCGW. The texts of the messages are compiled in an overview at the end of the description.

In the event of an unexpected disconnection, the arriving messages are not saved in the CCGW and are transmitted by the CCGW during the next login of the corresponding user. That is to say if this user has set a monitoring point on a device, then the unidirectional CSTA events are forwarded to the user. These events are only relevant for a limited period however. If the user logs into the XMPP server hours or even days after the last disconnection, then it is completely irrelevant which events occurred in the user's absence. Rather, the sender of the CSTA events (i.e. the CCGW) can cancel the monitoring point by receiving the error type IQ stanza and therefore stop sending additional, unnecessary XMPP messages. Another option for starting and/or stopping transmission of CTI services and messages using IQ stanzas between CCGW and XMPP clients (via XMPP server) is the use of "directed presence" messages (RFC 3921bis). In this case, the XMPP client sends its presence status (for example in the form: unavailable) directly to the CCGW. The CCGW recognizes the online status of the XMPP client and can respond accordingly. The use of the directed presence mechanism furthermore has the added advantage that the CCGW does not have to be located in the roster (contact list) of the user to get presence messages, and thus the user always sees only his contact list with "real" users. The behavior of an XMPP server in response to the receipt of different message types is defined for different cases within the RFC 3921bis. The described cases, for example, include that the Jabber ID does not exist, or that the JID exists, but is not available via the addressed resource. The configurations of this RFC administer XMPP servers upon receipt of an IQ message, that either is not addressed directly to a resource or if the addressed resource is not available, in that the server responds with the <service unavailable/> error type. In this case, an error on the IQ stanza request of the CSTA event type could automatically stop or pause the CSTA monitoring point.

So-called XMPP direct presence messages (RFC 3921bis) can also be used in order to inform the device CCGW about the online status of its clients, even if the CCGW is not found in the user roster. To achieve this, the client would have to address a presence message directly to the CCGW If the XMPP client server switches off the XMPP client server in a controlled fashion (i.e. the user closes the XMPP client application), the client application sends an "unavailable" type of presence stanza to its XMPP server. According to RFC 3921bis, this presence stanza must also be sent by the XMPP server to the XMPP terminals that were previously provided by the client application with direct presence messages (i.e. also to the CCGW). The CCGW can then stop the CSTA monitoring point in the CCGW. Because the XMPP server monitors the XMPP connection to its XMPP clients, the XMPP server also notices whether the connection to an XMPP client was lost in an uncontrolled manner (e.g. by failure of the corresponding LAN segment). This XMPP client is now no longer reachable, so it receives the status "unavailable". The XMPP server must also independently inform any XMPP entities that previously only received "directed presence" stanzas from this client with an "unavailable" type presence stanza (thus, also the CCGW) (see RFC 3921bis).

In both cases (i.e. in controlled and uncontrolled interruptions of the XMPP client-server connection), the "directed presence" functionality according to RFC 3921bis can therefore automatically be used to stop or pause the CSTA monitoring point in the CCGW.

The cited documents can be retrieved on the Internet at the website of the International Engineering Task Force. It is assumed here that 3920bis19 and 3921bis17 replace the existing RFC 3920 and RFC 3921.

Figure 5:
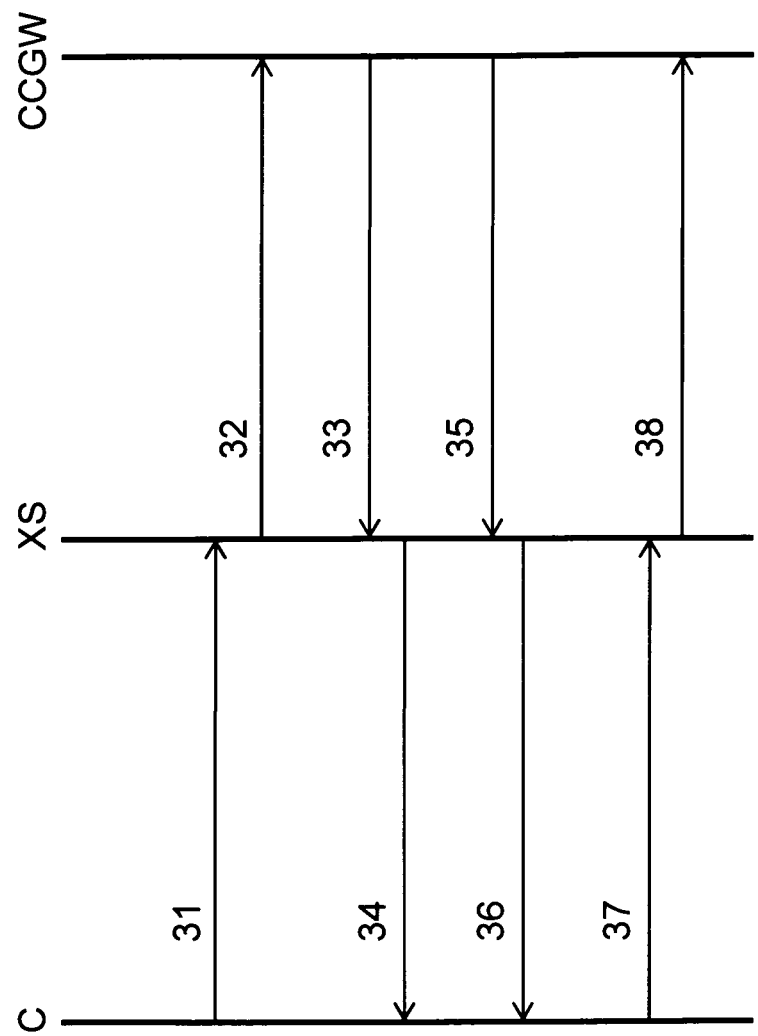
FIG. 5 schematically shows a flow diagram of a component of a sequence of one method according to the invention based on a preferred exemplary embodiment of the invention.

FIGS. 5 to 9 show further exemplary embodiments of the invention in which the connection between the CCGW and XMPP server is realized as a client-server connection. The CCGW device in these cases is preferably likewise administered as an XMPP client on the XMPP server. FIG. 5 shows the transmission of CSTA services and events. The client C is preferably an XMPP client, the server S is an XMPP server that takes on a purely passive role as a router. The client C sends a message 31 with the text 31 to the server XS, whereupon the server XS sends a message 32 with the text 32 to the device CCGW. The device CCGW now sends a message 33 with the text 33 to the server XS, whereupon the server sends a message 34 with the text 34 to the client. Afterwards, the device CCGW sends a message 35 with the text 35 to the server, whereupon the server sends a message 36 with the text 36 to the client C. Afterwards, the client C sends a message 37 with the text 37 to the server, whereupon the server sends a message 38 with the text 38 to the device CCGW.

Figure 6:
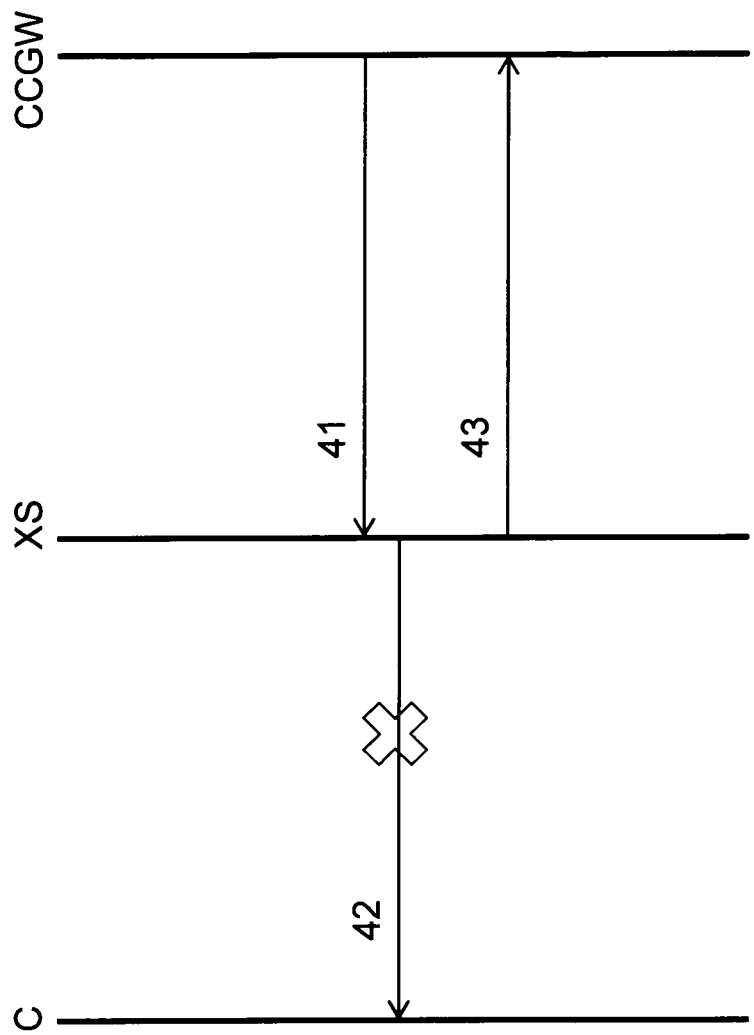
FIG. 6 schematically shows a flow diagram of a component of a sequence of one method according to the invention based on a preferred exemplary embodiment of the invention.

FIG. 6 shows the behavior when the client is not available. The device CCGW sends a message 41 with the text 41 to the server XS, whereupon the server XS sends a message 43 with the text 43 to the device CCGW. Sending of a message 42 by the server to the client C does not happen here. The XMPP server takes on an active role here because no "end-to-end" connection exists (any longer).

Figure 7:
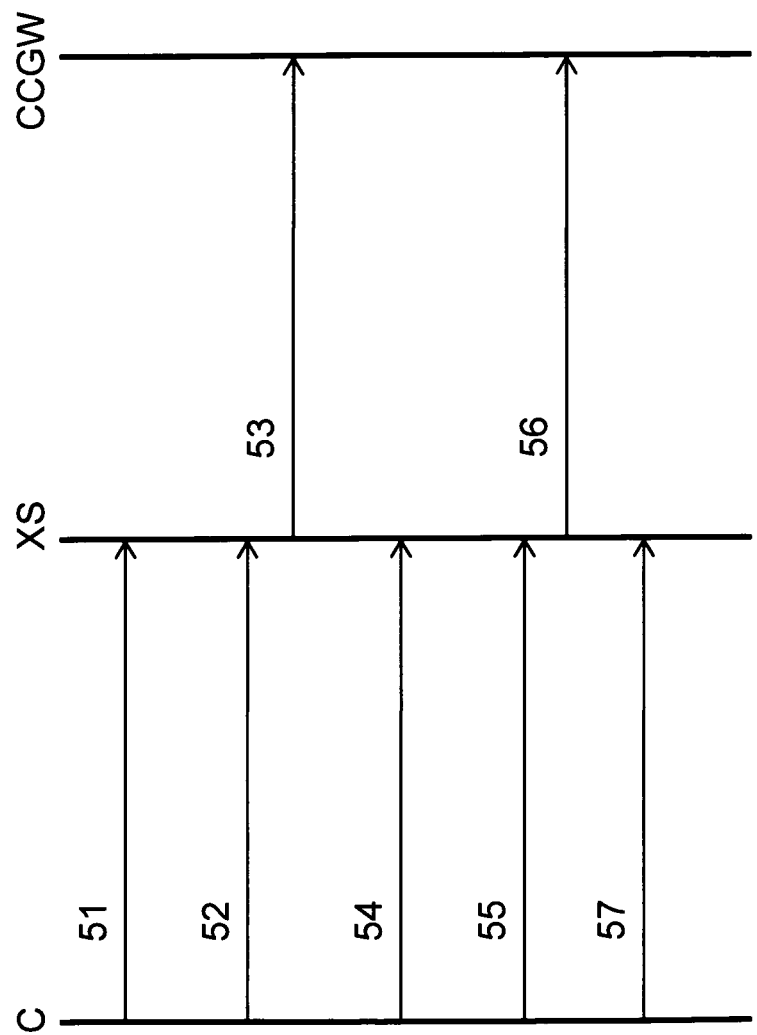
FIG. 7 schematically shows a flow diagram of a component of a sequence of one method according to the invention based on a preferred exemplary embodiment of the invention.

FIG. 7 shows a further exemplary embodiment of the invention based on the use of direct presence messages. Here, the XMPP client has the address test@example.com/test, the server S is an XMPP server, and the device CCGW is set up as an XMPP client with the address ccgw@example.com/ccgw. The client C sends a message 51 with the text 51 and subsequently a message 52 with the text 52 to the server. Thereupon the server sends a message 53 with the text 53 to the device CCGW. The client C sends a message 54 with the text 54 and subsequently a message 55 with the text 55 to the server. Thereupon the server sends a message 56 with the text 56 to the device CCGW. Afterwards, the client C sends a message 57 with the text 57 to the server. In this example, the XMPP client sends the direct presence status to the device CCGW for logon and logoff.

Figure 8:
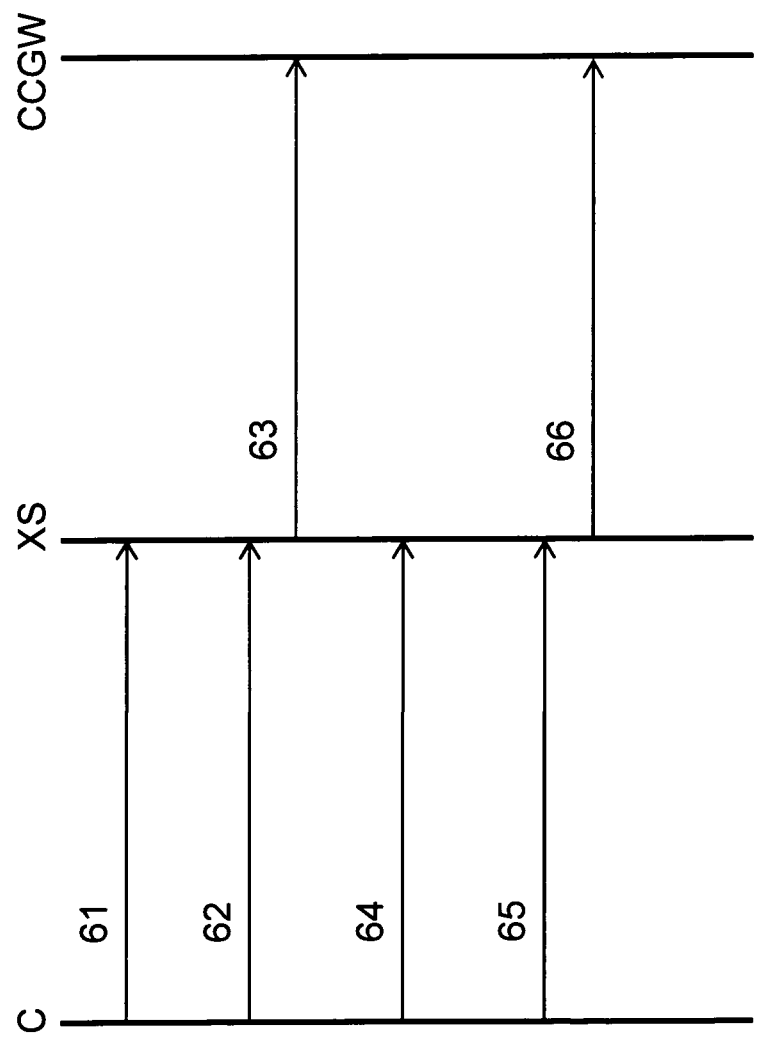
FIG. 8 schematically shows a flow diagram of a component of a sequence of one method according to the invention based on a preferred exemplary embodiment of the invention.

In the exemplary embodiment shown in FIG. 8, the XMPP client C has the address test@example.com/test, the server S is an XMPP server, and the device CCGW is set up as an XMPP client with the address ccgwgexample.com/ccgw.

Upon a logoff without direct presence status by the client, the server assumes this task. The client C sends a message 61 with the text 61 and a message 62 with the text 62 to the server, whereupon the server sends a message 63 with the text 63 to the device CCGW. The client C then sends a message 64 with the text 64 and a message 65 with the text 65 to the server, whereupon the server sends a message 63 with the text 66 to the device CCGW.

Figure 9:
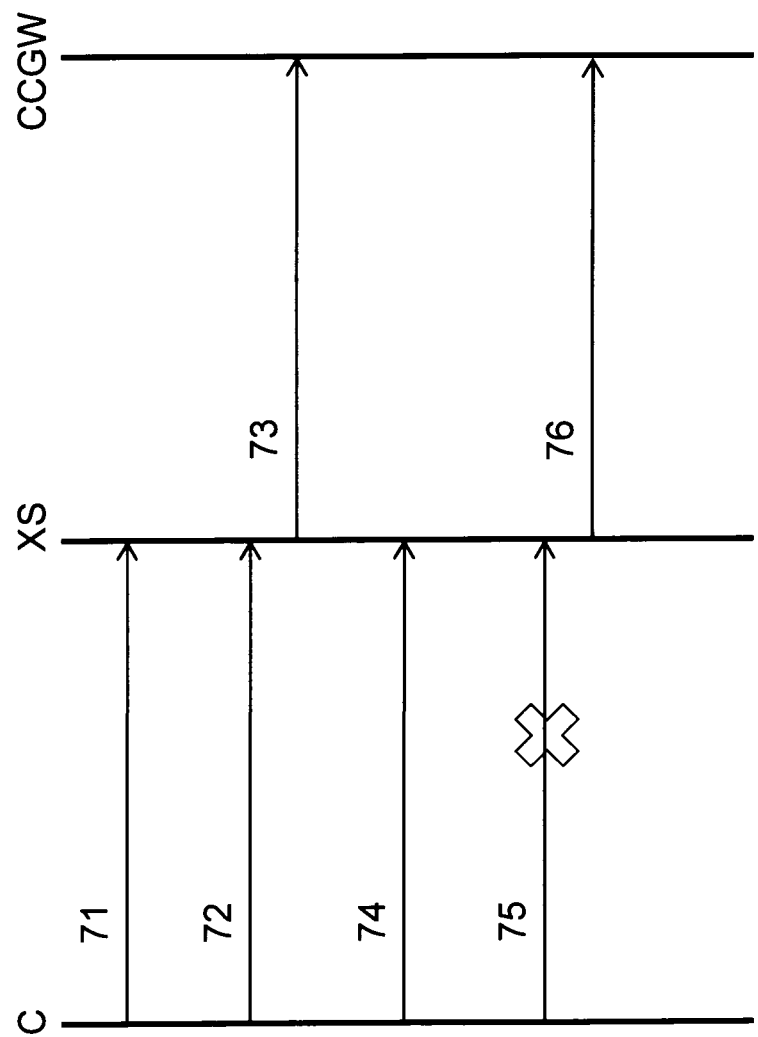
FIG. 9 schematically shows a flow diagram of a component of a sequence of one method according to the invention based on a preferred exemplary embodiment of the invention.

In the exemplary embodiment in FIG. 9, the XMPP client C has the address test@example.com/test, the server S is an XMPP server, and the device CCGW is set up as an XMPP client with the address ccgw@example.com/ccgw. For connection interruptions between the client and server, the server must send the direct presence status. The client C sends a message 71 with the text 71 and a message 72 with the text 72 to the server, whereupon the server sends a message 73 with the text 73 to the device CCGW. The client C then sends a message 74 with the text 74 to the server, whereupon the server sends a message 76 with the text 76 to the device CCGW. Sending of the message 75 by the client C to the server S does not happen in this case.

Below is a list of the message texts used in the description that is an express component of the present description.

---

Text 11:
<iq from="test@example .com/test " to="ccgw@example. com/ccgw"
xml :lang="en"
id="123456" type="set">
<csta xmlns="csta" version="1 .0" encoding="UTF-8 ">
<MakeCall xmlns="http ://www.ecma- ...
Text 12:
<iq from="ccgw@example. com/ccgw" to=" test@example. com/test "
xml :lang="en"
id="123456" type="result ">
<csta xmlns="csta" version="1 .0" encoding="UTF-8 ">
<MakeCallResponse xmlns="http://www.ecma-...
Text 13:
<iq from="ccgw@example .com/ccgw" to="test@example .com/test "
xml :lang="en" id="234567" type="set">
<csta xmlns="csta" version="1 .0" encoding="UTF-8 ">
<ServiceInitiatedEvent xmlns="http ://www.ecma-
Text 14:
<iq from="test@example. com/test " to="ccgw@example. com/ccgw"
xml :lang="en"
id="234567" type="result " />
Text 21:
<iq to="seb@wit0234c/sebl" type="set" from="ccgw@wit0234c/ccgw"
xmlns="jabber: client" id="as234sf d">
<csta xmlns="csta" version="1 .0" encoding="UTF-8 ">
<EstablishedEvent xmlns :csta="http://www. ecma- ...
...
</EstablishedEvent>
</csta>
</iq>
Text 22:
<iq from="seb@wit0234c/sebl" to="ccgw@wit0234c/ccgw"
type="error"
id="as234sfd">
<csta xmlns="csta" version="1 .0" encoding="UTF-8">
<EstablishedEvent xmlns :csta="http ://www. ecma- ...
...
</csta>
<error code="503" type="cancel ">
<service-unavailable
xmlns="urn :iet f :params :xml :ns :xmppstanzas" />
</error>
</iq>
Text 31:
<iq from="test@example . com/test" to="ccgw@example .com/ccgw"
id="123456" type-"set" >
<csta xmlns="csta" version="1 .o" encoding="UTF- 8" >
<MakeCall xmlns="http ://www . ecma- ...
Text 32:
<iq from="test@example .com/test" to="ccgw@example .com/ccgw"
id="123456" type="set" >

<csta xmlns-"csta" version-"1 .0" encoding-"UTF- 8" >
<MakeCall xmlns-"http ://www .ecma- ...
Text 33:
<iq from="ccgw@example .com/ccgw" to="test@example .com/test"
id="123456" type="result " >
<csta xmlns="csta" version="1 .o" encoding="UTF- 8" >
<MakeCallResponse xmlns- "http ://www .ecma- ...
Text 34:
<iq from="ccgw@example .com/ccgw" to="test@example .com/test "
id="123456" type="result" >
<csta xmlns="csta" version="1 .0" encoding="UTF- 8" >
<MakeCallResponse xmlns- "http ://www. ecma- ...
Text 35:
<iq from="ccgw@example .com/ccgw" to="test@example .com/test"
id-"234567" type-"set" >
<csta xmlns="csta" version="1 .0" encoding="UTF 8" >
OerviceInitiatedEvent xmlns=" http ://www . ecma- ...
Text 36:
<iq from="ccgw@example .com/ccgw" to="test@example .com/test "
id="234567" type="set" >
<csta xmlns="csta" version="1 .0" encoding= "UTF- 8">
<ServiceInitiatedEvent xmlns=,, http ://www . ecma- ...
Text 37:
<iq from-"test@example .com/test" to-"ccgw@example .
com/ccgw"
id="234567" type="result " / >
Text 38:
<iq from-"test@example .com/test" to-"ccgw@example .com/ccgw"
id="234567" type="result " / >
Text 41 = Text 35
Text 43:
<iq from= "test@example .com/test" to= "ccgw@example .com/ccgw"
id= "234567" type= "error" >
<csta xmlns= "csta" version="1 .0" encoding="UTF- 8" >
<ServiceInitiatedEvent xmlns= "http://www.ecma- ..
</csta>
<error code= "503" type= "cancel" >
<service- unavailable xmlns= "urn : ietf : params : xml :... " />
</error>
</iq>
Text 51:
<presence/>
Text 52:
<presence to= "ccgw@example .com/ccgw" />
Text 53:
<presence from= "test@example .com/test"
to= "ccgw@example .com/ccgw" />
Text 54:
<presence>
<show>away</ show>
<status>gone fishing</status>
</presence>
Text 55:
<presence to= "ccgwgexample .com/ccgw" type= "unavailable" />
Text 56:
<presence from= "test@example .com/test"
to= "ccgw@example .com/ccgw" type= "unavailable" / >
Text 57:
<presence type= "unavailable" / >
Text 61 = Text 51 = Text 71
Text 62 = Text 52 = Text 72
Text 63 = text 53 = Text 73
Text 64 = Text 54 = Text 74
Text 65 = Text 57
Text 66 = Text 56 = Text 76

---

The invention is not limited to the exemplary embodiments as described; the person skilled in the art can discover further exemplary embodiments of the invention based on the description given here.

The invention claimed is:

1. A method for automatic monitoring of a connection of an exchange system in a telecommunications network with a data network, wherein an exchange system of the telecommunications network is connected with an instant messaging (IM) server of the data network via a device, said device enabling the IM server to provide computer telephony integration services of the exchange system to a communication participant on the data network, the method comprising:

transmitting computer telephony integration services via the IM server using a request/response mechanism;

transmitting messages associated with use of the computer telephony integration services between the device and a client of the IM server via the IM server;

compiling text of the messages transmitted between the device and the client at an end of a description of a message to be sent to the device, the compiled text providing information relating to the computer telephony integration services, the message configured to be sent to the device as an Extensible Messaging and Presence Protocol Info/Query (XMPP IQ) message to enable the device to monitor a computer telephony integration link about which the computer telephony integration services are provided to the client via the IM server; and providing an error message to the device in response to a failure of the computer telephony integration link using the request/response mechanism, the request/response mechanism being comprised of at least one Info/Query (IQ) stanza.

2. A method for automatic monitoring of a connection of an exchange system in a telecommunications network with a data network, wherein an exchange system of the telecommunications network is connected with an instant messaging (IM) server of the data network via a device, said device enabling the IM server to provide computer telephony integration services of the exchange system to a communication participant on the data network, the method comprising:

transmitting computer telephony integration services via the IM server using a request/response mechanism;

transmitting messages using a request/response system; and providing an error message to a sender in response to a failure using the request/response mechanism;

enabling the IM server to provide computer telephony integration services of the exchange system to a communication participant on the data network by enabling an IM client to subscribe to the computer telephony integration services of the exchange system; and wherein the IM client is an Extensible Messaging and Presence Protocol (XMPP) client, and wherein the device performs mapping between a Computer Supported Telecommunications Applications (CSTA) specific Invoke ID on one side and a Jabber identifier of at least one of the IM client and an XMPP session ID on the other side.

3. The method of claim 2, wherein the request/response mechanism is an Info/Query (IQ) stanza mechanism.

4. The method of claim 2, wherein the request/response mechanism is a direct presence message.

5. A method for automatic monitoring of a connection of an exchange system in a telecommunications network with a data network, wherein an exchange system of the telecommunications network is connected with an instant messaging (IM) server of the data network via a device, said device enabling the IM server to provide computer telephony integration services of the exchange system to a communication participant on the data network, the method comprising:

transmitting computer telephony integration services via the IM server using a request/response mechanism;

transmitting messages using a request/response system; and providing an error message to a sender in response to a failure using the request/response mechanism; and realizing communication between the device and the IM server via a member of the group consisting of a server component according to XEP 0114 and a Jabber component protocol comparable to XEP 0114.

6. The method of claim 5, further comprising enabling the IM server to provide computer telephony integration services of the exchange system to a communication participant on the data network by enabling an IM client to subscribe to the computer telephony integration services of the exchange system.

7. The method of claim 5, comprising realizing the communication between the device and the IM server as a server-server connection.

8. The method of claim 5, comprising realizing the communication between the device and the IM server as a server-client connection.

9. A method for automatic monitoring of a connection of an exchange system in a telecommunications network with a data network, wherein an exchange system of the telecommunications network is connected with an instant messaging (IM) server of the data network via a device, said device enabling the IM server to provide computer telephony integration services of the exchange system to a communication participant on the data network, the method comprising:

transmitting computer telephony integration services via the IM server using a request/response mechanism;

transmitting messages using a request/response system; and providing an error message to a sender in response to a failure using the request/response mechanism; and transporting Computer Supported Telecommunications Applications (CSTA) via Extensible Messaging and Presence Protocol (XMPP) with Info/Query (IQ) stanzas, said IQ stanzas featuring a second request/response mechanism that is comparable to the request/response mechanism used by CSTA.

10. A method for automatic monitoring of a connection of an exchange system in a telecommunications network with a data network, wherein an exchange system of the telecommunications network is connected with an instant messaging (IM) server of the data network via a device, said device enabling the IM server to provide computer telephony integration services of the exchange system to a communication participant on the data network, the method comprising:

transmitting computer telephony integration services via the IM server using a request/response mechanism;

transmitting messages using a request/response system; and providing an error message to a sender in response to a failure using the request/response mechanism; and with an instant messaging (IM) client, generating an Extensible Messaging and Presence Protocol (XMPP) session ID that is different from any other XMPP session IDs for said IM client.

11. The method of claim 10, wherein a request to an associated response uses an Invoke ID.

12. The method of claim 11, wherein the Invoke ID used for assignment of a request to an associated response in the request/response mechanism is unique among all requests.

* * * * *